United States Patent
Huang et al.

(10) Patent No.: US 8,306,165 B2
(45) Date of Patent: Nov. 6, 2012

(54) TRAFFIC-TO-PILOT RATIO ESTIMATION FOR MIMO-OFDM SYSTEM

(75) Inventors: Yuheng Huang, San Diego, CA (US); Brian C. Banister, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 375 days.

(21) Appl. No.: 12/768,305

(22) Filed: Apr. 27, 2010

(65) Prior Publication Data
US 2010/0278290 A1 Nov. 4, 2010

Related U.S. Application Data

(60) Provisional application No. 61/173,696, filed on Apr. 29, 2009.

(51) Int. Cl.
*H03D 1/04* (2006.01)
(52) U.S. Cl. .......................... 375/346; 375/347
(58) Field of Classification Search .................. 375/346, 375/350, 347, 349
See application file for complete search history.

(56) References Cited

U.S. PATENT DOCUMENTS

| | | |
|---|---|---|
| 2005/0002478 A1 | 1/2005 | Agami et al. |
| 2009/0023437 A1* | 1/2009 | Cairns et al. ............... 455/422.1 |
| 2009/0202005 A1* | 8/2009 | Cairns ........................... 375/260 |

OTHER PUBLICATIONS

"A Method for blind determination of pilot to data power ratio for QAM signals" TSG-RAN Working Group 1, Aug. 1, 2001, pp. 1-2, XP002272534 the whole document.
Daniel P. Palomar, Yi Jiang: "MIMO Transceiver Design via Majorization Theory" Foundations and Trends in Communications and Information Theory, vol. 3, No. 4-5, Jan. 1, 2007, p. 370, XP002609932 the whole document.
International Search Report and Written Opinion—PCT/US2010/032819, International Search Authority—European Patent Office—Dec. 10, 2010.
Plass, Kaiser, Dammann, Fazel: Multi-carrier Spread Spectrum 2007 Jan. 1, 2007, Springer Netherlands , XP002609667 p. 379, the whole document.

* cited by examiner

*Primary Examiner* — Emmanuel Bayard
(74) *Attorney, Agent, or Firm* — Kenyon S. Jenckes

(57) ABSTRACT

A method for estimating a traffic-to-pilot ratio (TPR) for a received signal is disclosed. The received signal is despatialized to obtain a despatialized received signal. A channel matrix is despatialized to obtain a despatialized channel matrix. The despatialized received signal is whitened to obtain a pre-whitened despatialized received signal. The despatialized channel matrix is whitened to obtain a pre-whitened despatialized channel matrix. The estimated TPR for the received signal is determined using the pre-whitened despatialized received signal and one or more pre-whitened despatialized channel estimation coefficients.

24 Claims, 14 Drawing Sheets

US 8,306,165 B2

TRAFFIC-TO-PILOT RATIO ESTIMATION FOR MIMO-OFDM SYSTEM

CLAIM OF PRIORITY

This application is related to and claims priority from U.S. Provisional Patent Application Ser. No. 61/173,696 filed Apr. 29, 2009 for "Traffic-to-pilot ratio estimation for MIMO-OFDM system," which is incorporated herein by reference.

TECHNICAL FIELD

The present disclosure relates generally to communication systems. More specifically, the present disclosure relates to systems and methods for traffic-to-pilot ratio estimation for MIMO-OFDM system.

BACKGROUND

Wireless communication systems are widely deployed to provide various types of communication content such as voice, video, data, and so on. These systems may be multiple-access systems capable of supporting simultaneous communication of multiple terminals with one or more base stations.

As used herein, the term "mobile device" refers to an electronic device that may be used for voice and/or data communication over a wireless communication network. Examples of mobile devices include cellular phones, personal digital assistants (PDAs), handheld devices, wireless modems, laptop computers, personal computers, etc. A mobile device may alternatively be referred to as an access terminal, a mobile terminal, a subscriber station, a mobile station, a remote station, a user terminal, a terminal, a subscriber unit, user equipment, etc.

A wireless communication network may provide communication for a number of mobile devices, each of which may be serviced by a base station. A base station may alternatively be referred to as an access point, a Node B, or some other terminology.

A mobile device may be required to estimate a traffic-to-pilot ratio (TPR) for critical functions of the mobile device. For example, a mobile device may estimate the TPR for the calculation of Linear Minimum Mean Square Error (LMMSE) equalizer coefficients, for the demodulation of high-order constellations, or for the calculation of log-likelihood ratio (LLR). Conventional TPR estimation algorithms use the raw received signal. Using the pre-whitened received signal and the effective channel may result in performance gains for TPR estimation, especially when there is significant correlation between multiple receive antennas.

DETAILED DESCRIPTION

Figure 1:
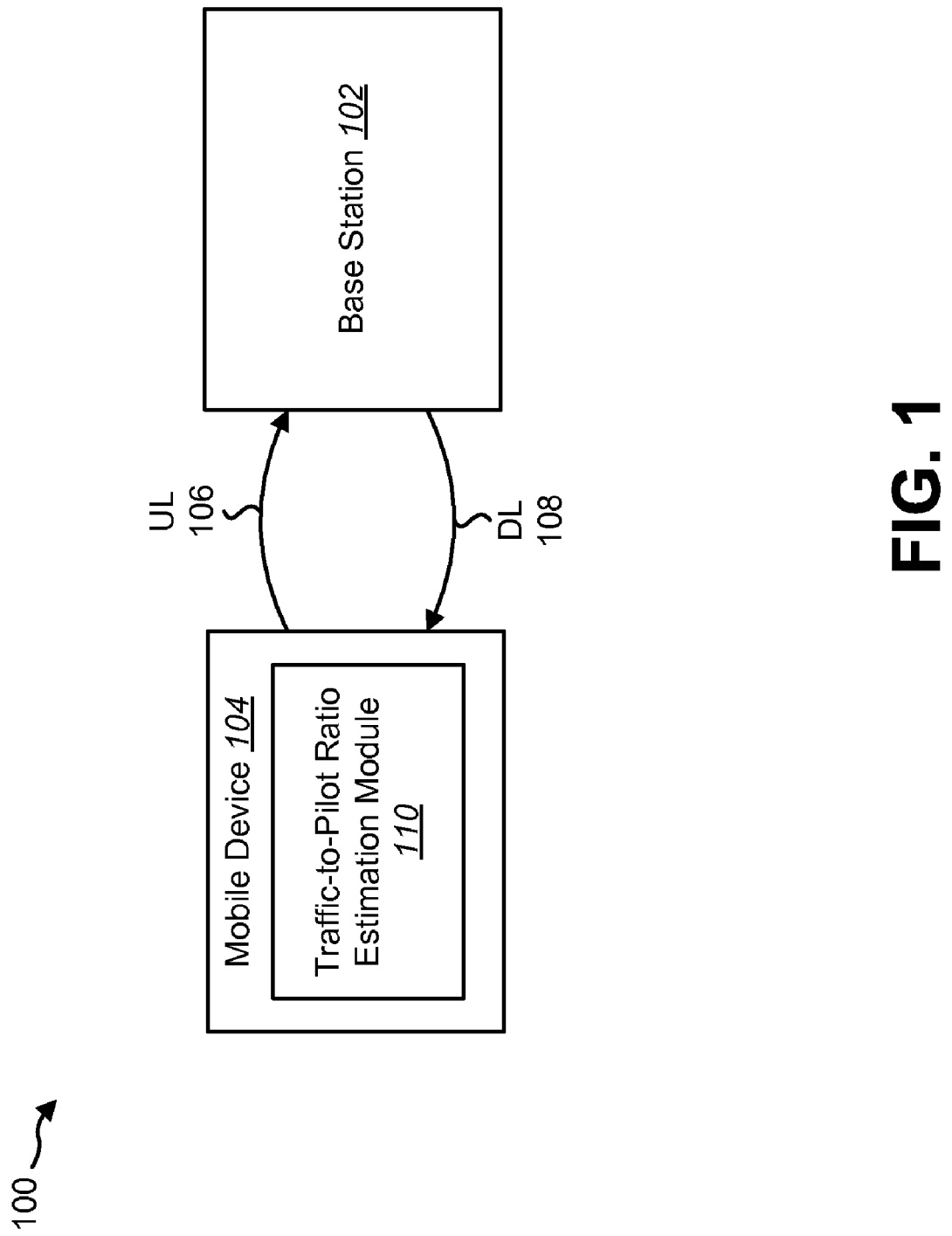
FIG. 1 shows a wireless communication system with multiple wireless devices.

A method for estimating a traffic-to-pilot ratio (TPR) for a received signal is described. The received signal is despatialized to obtain a despatialized received signal. A channel matrix is despatialized to obtain a despatialized channel matrix. The despatialized received signal is whitened to obtain a pre-whitened despatialized received signal. The despatialized channel matrix is whitened to obtain a pre-whitened despatialized channel matrix. An estimated TPR for the received signal is determined using the pre-whitened despatialized received signal and one or more pre-whitened despatialized channel estimation coefficients.

Determining the estimated TPR for the received signal may include estimating traffic energy for the pre-whitened despatialized received signal. Pilot energy for the pre-whitened despatialized channel matrix may be estimated. The estimated TPR may be determined using the estimated traffic energy and the estimated pilot energy.

Estimating traffic energy may include determining a total received energy. A noise component in the total received energy may be determined. A traffic energy estimate may be determined using the total received energy and the noise component in the total received energy. Determining a traffic energy estimate may be performed per subframe.

Estimating traffic energy may include decoding a physical downlink control channel (PDCCH). A resource block (RB) allocation may also be determined A task for traffic energy estimation may be created. Selected symbols may be read from a tone random access memory (RAM). The selected symbols may be processed by a whitener to obtain pre-whitened symbols. The traffic energy may be estimated using the pre-whitened symbols.

Estimating pilot energy may include multiplying the channel matrix by a precoding matrix to obtain a despatialized channel matrix. The despatialized channel matrix may be multiplied by a whitening matrix to obtain a pre-whitened despatialized channel matrix. A pilot energy estimate may be determined using the pre-whitened despatialized channel matrix. Determining a pilot energy estimate may be performed per subframe.

Estimating pilot energy may include decoding a physical downlink control channel (PDCCH). A precoding matrix may be determined A task for pilot energy estimation may be created. En estimated channel matrix may be multiplied by the precoding matrix and by a whitening matrix to generate a pre-whitened effective channel matrix. The pilot energy may be estimated using the pre-whitened effective channel matrix. The channel matrix may be an estimated channel matrix. The method may be performed by a mobile device. The mobile device may be configured to operate in a multiple-input and multiple-output (MIMO)-orthogonal frequency division multiplexing (OFDM) system.

A wireless device configured for estimating a traffic-to-pilot ratio (TPR) for a received signal is also described. The wireless device includes a processor, memory in electronic communication with the processor and instructions stored in the memory. The instructions are executable by the processor to despatialize the received signal to obtain a despatialized received signal. The instructions are also executable by the processor to despatialize a channel matrix to obtain a despatialized channel matrix. The instructions are further executable by the processor to whiten the despatialized received signal to obtain a pre-whitened despatialized received signal. The instructions are also executable by the processor to whiten the despatialized channel matrix to obtain a pre-whitened despatialized channel matrix. The instructions are further executable by the processor to determine an estimated TPR for the received signal using the pre-whitened despatialized received signal and one or more pre-whitened despatialized channel estimation coefficients.

A wireless device configured for estimating a traffic-to-pilot ratio (TPR) for a received signal is described. The wireless device includes means for despatializing the received signal to obtain a despatialized received signal. The wireless device also includes means for despatializing a channel matrix to obtain a despatialized channel matrix. The wireless device further includes means for whitening the despatialized received signal to obtain a pre-whitened despatialized received signal. The wireless device also includes means for whitening the despatialized channel matrix to obtain a pre-whitened despatialized channel matrix. The wireless device further includes means for determining an estimated TPR for the received signal using the pre-whitened despatialized received signal and one or more pre-whitened despatialized channel estimation coefficients.

A computer-program product for estimating a traffic-to-pilot ratio (TPR) for a received signal is also described. The computer-program product includes a computer-readable medium having instructions thereon. The instructions include code for despatializing the received signal to obtain a despatialized received signal. The instructions also include code for despatializing a channel matrix to obtain a despatialized channel matrix. The instructions further include code for whitening the despatialized received signal to obtain a pre-whitened despatialized received signal. The instructions also include code for whitening the despatialized channel matrix to obtain a pre-whitened despatialized channel matrix. The instructions further include code for determining an estimated TPR for the received signal using the pre-whitened despatialized received signal and one or more pre-whitened despatialized channel estimation coefficients.

FIG. 1 shows a wireless communication system 100 with multiple wireless devices. A wireless device may be a base station 102, a mobile device 104, or the like. A base station 102 is a station that communicates with one or more mobile devices 104. A base station 102 may also be referred to as, and may include some or all of the functionality of, an access point, a broadcast transmitter, a Node B, an evolved Node B, etc. Each base station 102 provides communication coverage for a particular geographic area. The term "cell" can refer to a base station 102 and/or its coverage area depending on the context in which the term is used.

A mobile device 104 may also be referred to as, and may include some or all of the functionality of, a terminal, an access terminal, a user equipment (UE), a subscriber unit, a station, etc. A mobile device 104 may be a cellular phone, a personal digital assistant (PDA), a wireless device, a wireless modem, a handheld device, a laptop computer, etc. A mobile device 104 may communicate with zero, one, or multiple base stations 102 on the downlink (DL) 108 and/or uplink (UL) 106 at any given moment. The downlink 108 (or forward link) refers to the communication link from a base station 102 to the mobile device 104, and the uplink 106 (or reverse link) refers to the communication link from the mobile device 104 to the base station 102.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA) systems. In one configuration, the wireless communication system may be an orthogonal frequency division multiplexing (OFDM) system.

The wireless communication system 100 may use MIMO. The term "multiple-input and multiple-output" (MIMO) refers to the use of multiple antennas at both the transmitter and receiver to improve communication performance. At the transmitter, each portion of a data stream may be transmitted from a different antenna. At the receiver, the different portions of the data stream may be received by different antennas and then combined. The terms "data stream" and "layer" are used interchangeably herein.

Communication between a mobile device 104 in a wireless system 100 (e.g., a multiple-access system) and a base station 102 is effected through transmissions over a wireless link comprised of a forward link and a reverse link. Such communication link may be established via a single-input and single-output (SISO), multiple-input and single-output (MISO), or a multiple-input and multiple-output (MIMO) system. A MIMO system consists of transmitter(s) and receiver(s) equipped, respectively, with multiple ($M_T$) transmit antennas and multiple ($M_R$) receive antennas for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The mobile device 104 may include a traffic-to-pilot ratio (TPR) estimation module 110. The mobile device 104 may use the traffic-to-pilot ratio estimation module 110 to estimate the TPR. TPR may be required by several critical functions of the mobile device 104. TPR may be necessary for the calculation of Linear Minimum Mean Square Error (LMMSE) equalizer coefficients. TPR may also be necessary for the demodulation of high-order constellations (e.g., 16-qaudrature amplitude modulation (QAM) and 64-QAM). TPR may further be necessary for the calculation of log-likelihood ratio (LLR). LLR may be useful for turbo decoding.

Table 1 below summarizes the coding, modulation, and MIMO transmission modes related to TPR for all physical downlink channels such as the physical downlink shared channel (PDSCH), the physical downlink control channel (PDCCH), the physical hybrid automatic repeat request indicator channel (PHICH), the physical broadcast channel (PBCH), and the physical control format indicator channel (PCFICH). The PDSCH is closely related to TPR for LMMSE, QAM, and LLR. Thus, the PDSCH may require estimating the TPR. MIMO modes may include spatial multiplexing and space-frequency block coded (SFBC) MIMO.

TABLE 1

| Downlink Channel | Coding | Modulation | MIMO Mode | Power controlled to UE | TPR impacts |
|---|---|---|---|---|---|
| PDSCH | Turbo | QPSK, 16-QAM, 64-QAM | Spatial multiplexing, SFBC | Yes | LMMSE, QAM, LLR |
| PDCCH | Convolutional | QPSK | SFBC | Yes | LMMSE, LLR [LLR bit-width] |
| PHICH | (3.1) Repetition | BSKP | SFBC | Yes | LMMSE |
| PBCH | Convolutional | QPSK | SFBC | TPR close to 0 dB expected | LMMSE, LLR [LLR bit-width] |
| PCFICH | (32.2) Block | QPSK | SFBC | TPR close to 0 dB expected | LMMSE |

Because PDSCH has TPR impacts for LMMSE, QAM, and LLR, PDSCH may require estimating TPR. For each mobile device 104, the PDSCH-to-reference signal (RS) energy per resource element (EPRE) ratio among PDSCH resource elements (RE) in all the OFDM symbols not containing RS may be equal and may be denoted by $\rho_A$. For each mobile device 104, the PDSCH-to-RS EPRE ratio among PDSCH REs in all of the OFDM symbols containing RS may be equal and may be denoted by $\rho_B$. The cell-specific ratio $\rho_B/\rho_A$ may be signaled by higher layers.

Figure 2:
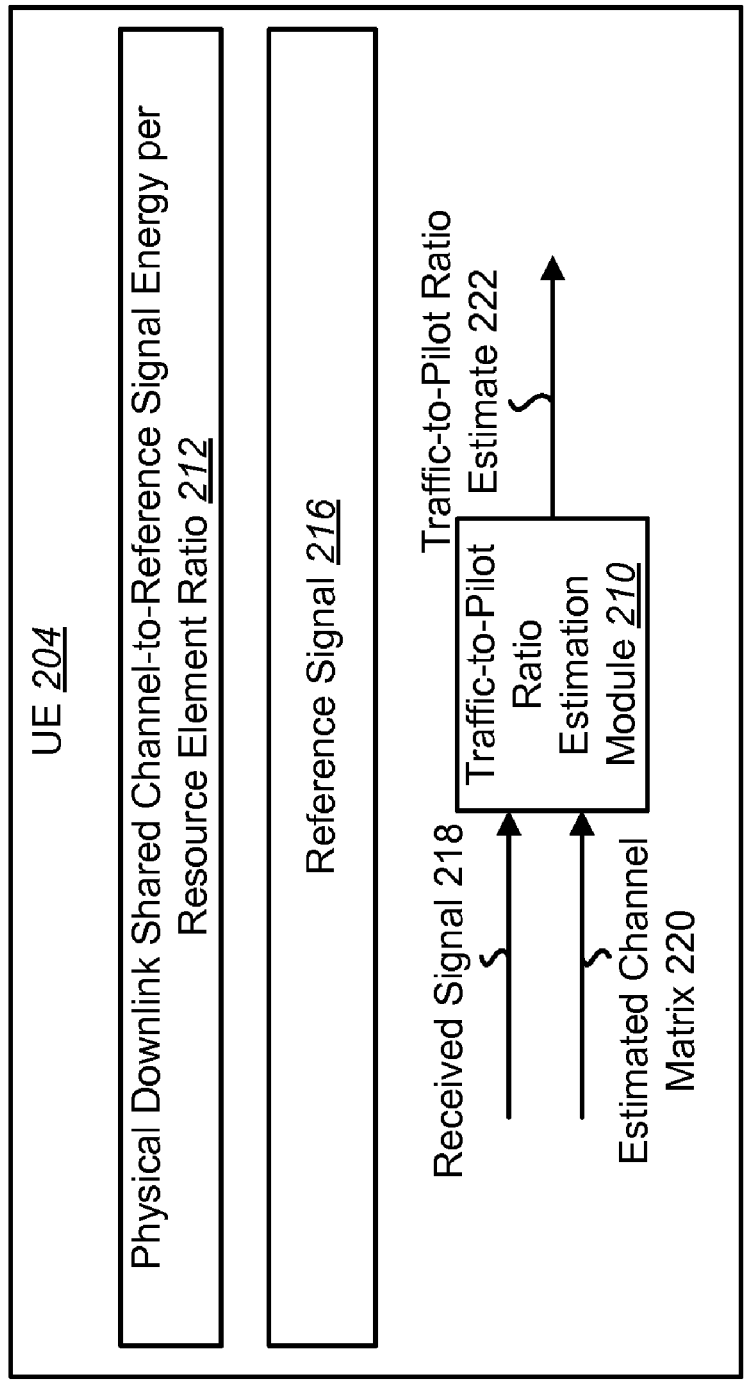
FIG. 2 is a block diagram illustrating a user equipment (UE) for use in the present systems and methods.

FIG. 2 is a block diagram illustrating a UE 204 for use in the present systems and methods. The UE 204 of FIG. 2 may be one configuration of the mobile device 104 of FIG. 1. The UE 204 may include the PDSCH-to-RS EPRE ratio 212. The UE 204 may include the reference signal (RS) 216. The RS 216 may also be referred to as the pilot signal.

The UE 204 may also include the received signal 218. The received signal 218 may be denoted as y[k, l], where k is the tone index within an OFDM symbol and l is the OFDM symbol index within a sub-frame.

The UE 204 may include the estimated channel matrix 220. A traffic-to-pilot ratio estimation module 210 may generate a traffic-to-pilot ratio estimate 222 using the received signal 218 and the estimated channel matrix 220. The traffic-to-pilot ratio estimation module 210 of FIG. 2 may be one configuration of the traffic-to-pilot ratio estimation module 110 of FIG. 1.

Figure 3:
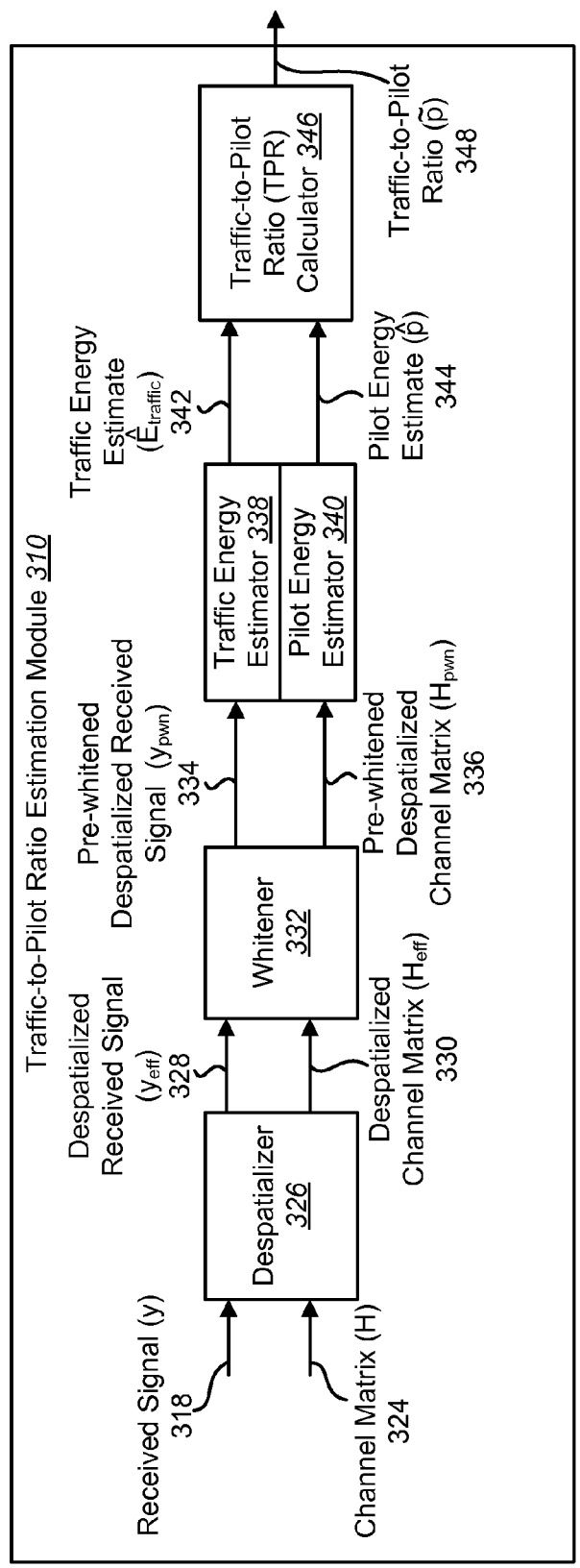
FIG. 3 is a block diagram illustrating a traffic-to-pilot ratio estimation module.

FIG. 3 is a block diagram illustrating a traffic-to-pilot ratio estimation module 310. The traffic-to-pilot ratio estimation module 310 of FIG. 3 may be one configuration of the traffic-to-pilot ratio estimation module 110 of FIG. 1. The traffic-to-pilot ratio estimation module 310 may use the received signal 318 y and the channel matrix 324 H to estimate the traffic-to-pilot ratio 348. Traffic energy estimation may be performed per subframe. For the $k^{th}$ subcarrier and the $l^{th}$ OFDM symbol within a subframe, the channel model may be represented using Equation (1):

$$y[k, l] = \sqrt{E_s}\, H[k, l]P[k, l]s[k, l] + \eta[k, l] \quad (1)$$
$$= \sqrt{E_s}\, H_{\textit{eff}}[k, l]s[k, l] + \eta[k, l].$$

In Equation (1), s[k,l] is the L×1 transmitted signal with $E(s[k,l]s^*[k,l])=I$, y[k,l] is the $N_r$×1 received signal 318, and $\eta[k,l]$ is the $N_r$×1 noise vector with correlation vector $R_{nn}$. H[k,l] is the $N_r \times N_t$ channel matrix 324, P[k, l] is the $N_r$×L precoding matrix, and $H_{\textit{eff}}[k, l]$ is the $N_r$×L effective channel matrix 330. $E_S$ may be defined using Equation (2):

$$E_S = \begin{cases} E_A & \text{when } (k, l) \in \Phi_A \\ E_B & \text{when } (k, l) \in \Phi_B \end{cases} \quad (2)$$

In Equation (2), $\Phi_A$ is the collection of index pairs (k, l) for resource elements with a traffic-to-pilot ratio $\rho_A$. In Equation (2), $\Phi_B$ is the collection of index pairs (k, l) for resource elements with a traffic-to-pilot ratio $\rho_B$. $E_B/E_Q=\rho_B/\rho_A$ may be signaled via higher layers.

In one configuration, the raw received signal y[k, l] 318 may be pre-whitened and then used for traffic energy estimation. The raw received signal y[k, l] 318 may be pre-whitened by a whitener 332. In one configuration, the raw received signal 318 may be despatialized by a despatializer 326 to obtain a despatialized received signal ($y_{\textit{eff}}$) 328 prior to being whitened by the whitener 332. The despatialized received signal 328 may also be referred to as the effective received signal. The output of the whitener 332 may be referred to as the pre-whitened despatialized received signal ($y_{pwn}$) 334. The pre-whitened despatialized received signal 334 is given in Equation (3):

$$y_{pwn}[k, l] = R_{nn}^{-1/2} y[k, l] \quad (3)$$
$$= \sqrt{E_s}\, R_{nn}^{-1/2} H_{\textit{eff}}[k, l]s[k, l] + R_{nn}^{-1/2}\eta[k, l]$$
$$= \sqrt{E_s}\, H_{pwn}[k, l]s[k, l] + \eta_{pwn}[k, l].$$

In Equation (3), $R_{nn}^{-1/2}$ is the $N_r \times N_r$ whitening matrix used by the whitener 332, $y_{pwn}[k, l]$ is the $N_r$×1 pre-whitened despatialized received signal 334, $\eta_{pwn}[k,l]$ is the $N_r \times N_r$ noise vector with correlation matrix $R_{\eta\eta,pwn}=I$, and $H_{pwn}[k,l]$ is the $N_r$×L pre-whitened despatialized channel matrix 336. The total received energy (including both signal and interference) summed over all resource elements within $\Phi_A$ is given in Equation (4):

$$T_A = \sum_{(k,l)\in\Phi_A} \sum_{q=0}^{N_r-1} |y_{pwn}[k, l, q]|^2 = \sum_{(k,l)\in\Phi_A} \|y_{pwn}[k, l]\|_F^2. \quad (4)$$

In Equation (4), $y_{pwn}[k, l, q]$ is the pre-whitened symbol at the $q^{th}$ receive antenna. Similar to Equation (4), the total received energy summed over all resource elements within $\Phi_B$ is given in Equation (5):

$$T_B = \sum_{(k,l) \in \Phi_B} \sum_{q=0}^{N_r-1} |y_{pwn}[k, l, q]|^2 = \sum_{(k,l) \in \Phi_B} \|y_{pwn}[k, l]\|_F^2. \quad (5)$$

It may be straightforward to derive Equation (6):

$$E(T_A \mid H_{pwn}[k, l]) = \qquad (6)$$
$$E_A \sum_{(k,l) \in \Phi_A} E[Tr(H_{pwn}[k, l]s[k, l]s^*[k, l]H^*_{pwn}[k, l])] +$$
$$\sum_{(k,l) \in \Phi_A} E[Tr(\eta[k, l]\eta^*[k, l])] =$$
$$E_A \sum_{(k,l) \in \Phi_A} [Tr(H_{pwn}[k, l]H^*_{pwn}[k, l])] + \sum_{(k,l) \in \Phi_A} Tr(R_{\eta\eta, pwn}) =$$
$$E_A \sum_{(k,l) \in \Phi_A} [\|H_{pwn}[k, l]\|_F^2] + |\Phi_A|N_r.$$

In Equation (6), $|\Phi_A|$ is the cardinality of $\Phi_A$. Similar to Equation (6), Equation (7) may be derived:

$$E(T_B \mid H_{pwn}[k, l]) = E_B \sum_{(k,l) \in \Phi_B} [\|H_{pwn}[k, l]\|_F^2] + |\Phi_B|N_r. \quad (7)$$

$T_A$ from Equation (4) and $T_B$ from Equation (5) may then be combined using Equation (8):

$$T = T_A + T_B \qquad (8)$$

A combination of Equation (6), Equation (7), and Equation (8) yields Equation (9):

$$E(T \mid H_{pwn}[k, l]) = E_A \sum_{(k,l) \in \Phi_A} [\|H_{pwn}[k, l]\|_F^2] + \qquad (9)$$
$$E_B \sum_{(k,l) \in \Phi_B} [\|H_{pwn}[k, l]\|_F^2] + N_r(|\Phi_A| + |\Phi_B|) = E_{traffic} + E_{noise}.$$

In Equation (9), the traffic component $E_{traffic}$ may be defined using Equation (10):

$$E_{traffic} = E_A \sum_{(k,l) \in \Phi_A} [\|H_{pwn}[k, l]\|_F^2] + E_B \sum_{(k,l) \in \Phi_B} [\|H_{pwn}[k, l]\|_F^2]. \quad (10)$$

In Equation (9), the noise component $E_{noise}$ may be defined using Equation (11):

$$E_{noise} = N_r(|\Phi_A| + |\Phi_B|). \quad (11)$$

Ideally, the estimator for $E_{traffic}$ would be $T - E_{noise}$. However, when the total interference is large, or when there are not enough tones to average, the estimator $T - E_{noise}$ may result in an invalid negative value. This may be solved by setting the traffic energy estimate $\hat{E}_{traffic}$ 342 from a traffic energy estimator 338 using Equation (12):

$$\hat{E}_{traffic} = \max\left(T - E_{noise}, \frac{T}{4}\right). \quad (12)$$

The pre-whitened effective channel matrices 336 may be used to estimate the pilot energy 344 using a pilot energy estimator 340. The pilot energy 344 may be estimated per subframe. For the $k^{th}$ subcarrier and the $l^{th}$ OFDM symbol within a subframe, the estimated channel matrix 324 obtained from a channel estimator is given in Equation (13):

$$\hat{H}[k,l] = \sqrt{E_{RS}}(H[k,l] + \tilde{H}[k,l]). \quad (13)$$

In Equation (13), $\tilde{H}[k,l]$ represents the channel estimation error matrix. It may be assumed that $\tilde{H}[k,l]$ has zero mean and is independent from the actual channel $H[k,l]$. The estimated channel matrix 324 of Equation (13) may be despatialized using a precoding matrix in the despatializer 326 to obtain the despatialized estimated channel matrix $H_{eff}$ 330. The despatialized estimated channel matrix 330 may also be referred to as the effective channel matrix. The despatialized estimated channel matrix 330 may then be whitened using a whitener 332 to obtain the pre-whitened despatialized estimated channel matrix 336. The pre-whitened despatialized estimated channel matrix 336 may also be referred to as the pre-whitened effective channel matrix. The pre-whitened despatialized estimated channel matrix 336 may be represented using Equation (14):

$$\hat{H}_{pwn}[k, l] = R_{nn}^{-1/2} \hat{H}[k, l] P[k] \qquad (14)$$
$$= \sqrt{E_{RS}} \left( R_{nn}^{-1/2} H[k, l] P[k] + R_{nn}^{-1/2} \tilde{H}[k, l] P[k] \right)$$
$$= \sqrt{E_{RS}} \left( H_{pwn}[k, l] + \tilde{H}_{pwn}[k, l] \right).$$

The pilot energy estimate 344 may be formulated using Equation (15):

$$\hat{P} = \sum_{(k,l) \in \Phi_B \cup \Phi_A} \left\| \hat{H}_{pwn}[k, l] \right\|_F^2. \quad (15)$$

The mean of the pilot energy estimate $\hat{P}$ 344 conditioned on the channel matrix 324 $H[k, l]$ is shown in Equation (16):

$$E(\hat{P} \mid H[k, l]) = E_{RS} \sum_{(k,l) \in \Phi_B \cup \Phi_A} \left[ \|H_{pwn}[k, l]\|_F^2 + E(\|\tilde{H}_{pwn}[k, l]\|_F^2) \right]. \quad (16)$$

The bias term $$E(\|\tilde{H}_{pwn}[k, l]\|_F^2)$$

of Equation (16) may be negligible when the channel estimation error is sufficiently small. Equation (15) may then be used as an estimator for $$E_{RS} \sum_{(k,l) \in \Phi_B \cup \Phi_A} [\|H_{pwn}[k, l]\|_F^2].$$

A traffic-to-pilot ratio (TPR) calculator 346 may then be used to determine a traffic-to-pilot ratio estimate $\hat{\rho}$ 348. The TPR calculator 346 may receive the traffic energy estimate $\hat{E}_{traffic}$ 342 of Equation (12) above from the traffic energy estimator 338 and the pilot energy estimate $\hat{P}$ 344 of Equation (15) above from the pilot energy estimator 340. The traffic-to-pilot ratio estimate 348 may be determined using the traffic energy estimate 342 and one or more coefficients of the pilot energy estimate 344. The traffic-to-pilot ratio estimate 348 may be calculated using Equation (17):

$$\hat{\rho} = \frac{\hat{E}_{traffic}}{\hat{P}}. \qquad (17)$$

Equation 17 may represent a mixture of $\rho_A$ and $\rho_B$. The final estimates for the $\rho_A$ and $\rho_B$ of the traffic-to-pilot ratio 348 are given in Equation (18):

$$\hat{\rho}_A = \hat{\rho} \cdot C_A$$

$$\hat{\rho}_B = \hat{\rho} \cdot C_B \qquad (18)$$

The coefficients $C_A$ and $C_B$ may be calculated using Equation (19):

$$C_A = \frac{1}{\alpha + (1-\alpha)\frac{\rho_B}{\rho_A}} \qquad (19)$$

$$C_B = \frac{\frac{\rho_B}{\rho_A}}{\alpha + (1-\alpha)\frac{\rho_B}{\rho_A}}.$$

As discussed above in relation to FIG. 1, the cell specific ratio $\rho_B/\rho_A$ may be signaled by higher layers. The variable $\alpha$ may be found using Equation (20):

$$\alpha = \frac{|\Phi_A|}{|\Phi_A| + |\Phi_B|}. \qquad (20)$$

Figure 4:
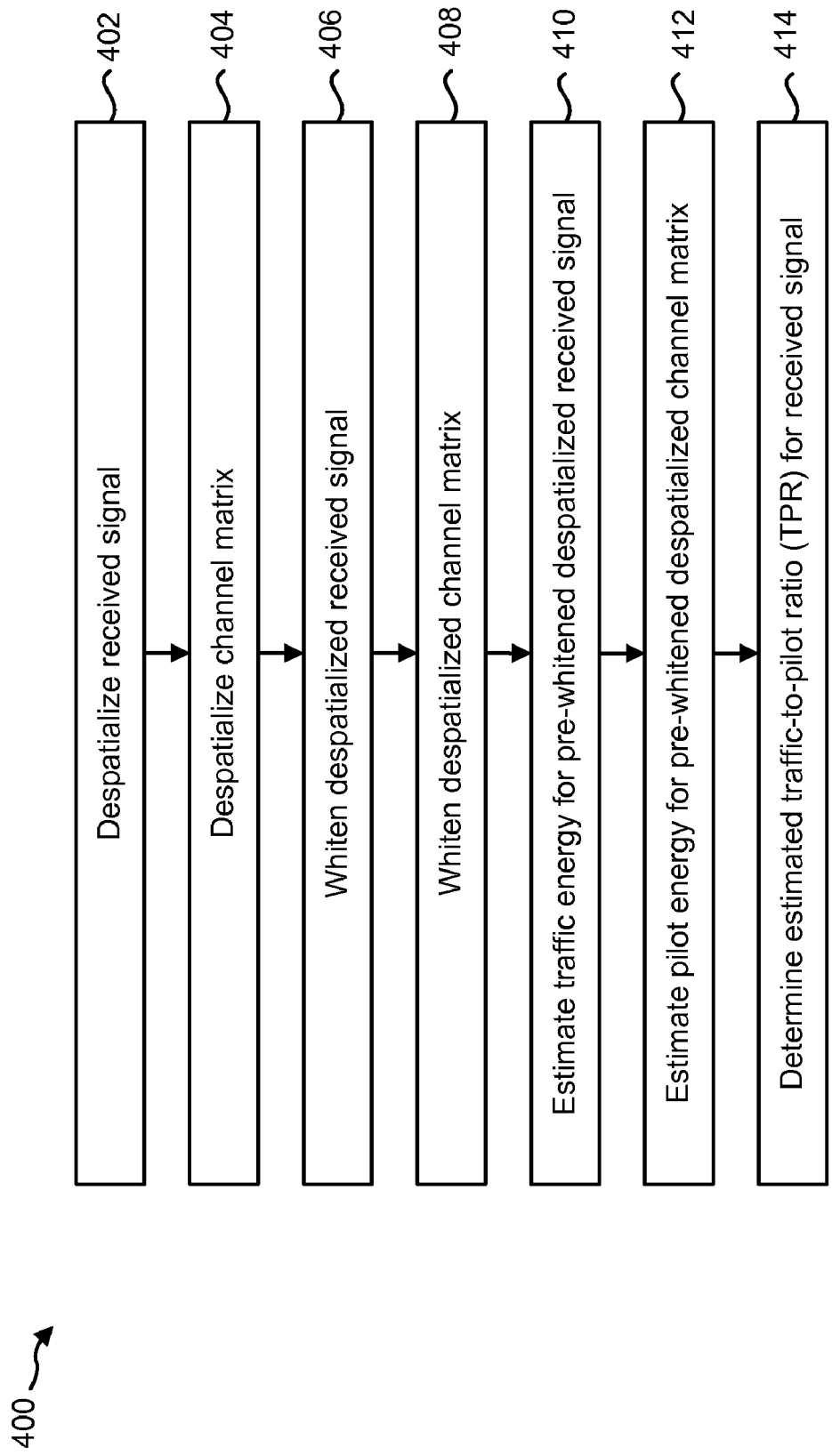
FIG. 4 is a flow diagram illustrating a method for determining the traffic-to-pilot ratio (TPR) for a received signal.

FIG. 4 is a flow diagram illustrating a method 400 for estimating the traffic-to-pilot ratio (TPR) 222 for a received signal 218. The method 400 may be performed by a mobile device 104. In one configuration, the mobile device 104 may be a UE 204. The mobile device 104 may despatialize 402 a received signal 218. The mobile device 104 may also despatialize 404 a channel matrix 220. The channel matrix 220 may be an estimated channel matrix. In one configuration, the received signal 218 and the channel matrix 220 may be stored in memory prior to the despatialization. Alternatively, the received signal 218 and the channel matrix 220 may be despatialized 404 continuously during reception.

The mobile device 104 may then whiten 406 the despatialized received signal 328. The mobile device 104 may also whiten 408 the despatialized channel matrix 330. The mobile device 104 may next estimate 410 the traffic energy 342 for the pre-whitened despatialized received signal 334. The mobile device 104 may also estimate 412 the pilot energy 344 for the pre-whitened despatialized channel matrix 336. In one configuration, the mobile device 104 may estimate 412 the traffic energy 342 and the pilot energy 344 concurrently. Once the mobile device 104 has estimated the traffic energy 342 and the pilot energy 344, the mobile device 104 may determine 414 the traffic-to-pilot ratio (TPR) 348 for the received signal 218. The traffic-to-pilot ratio 348 may be an estimate.

Figure 5:
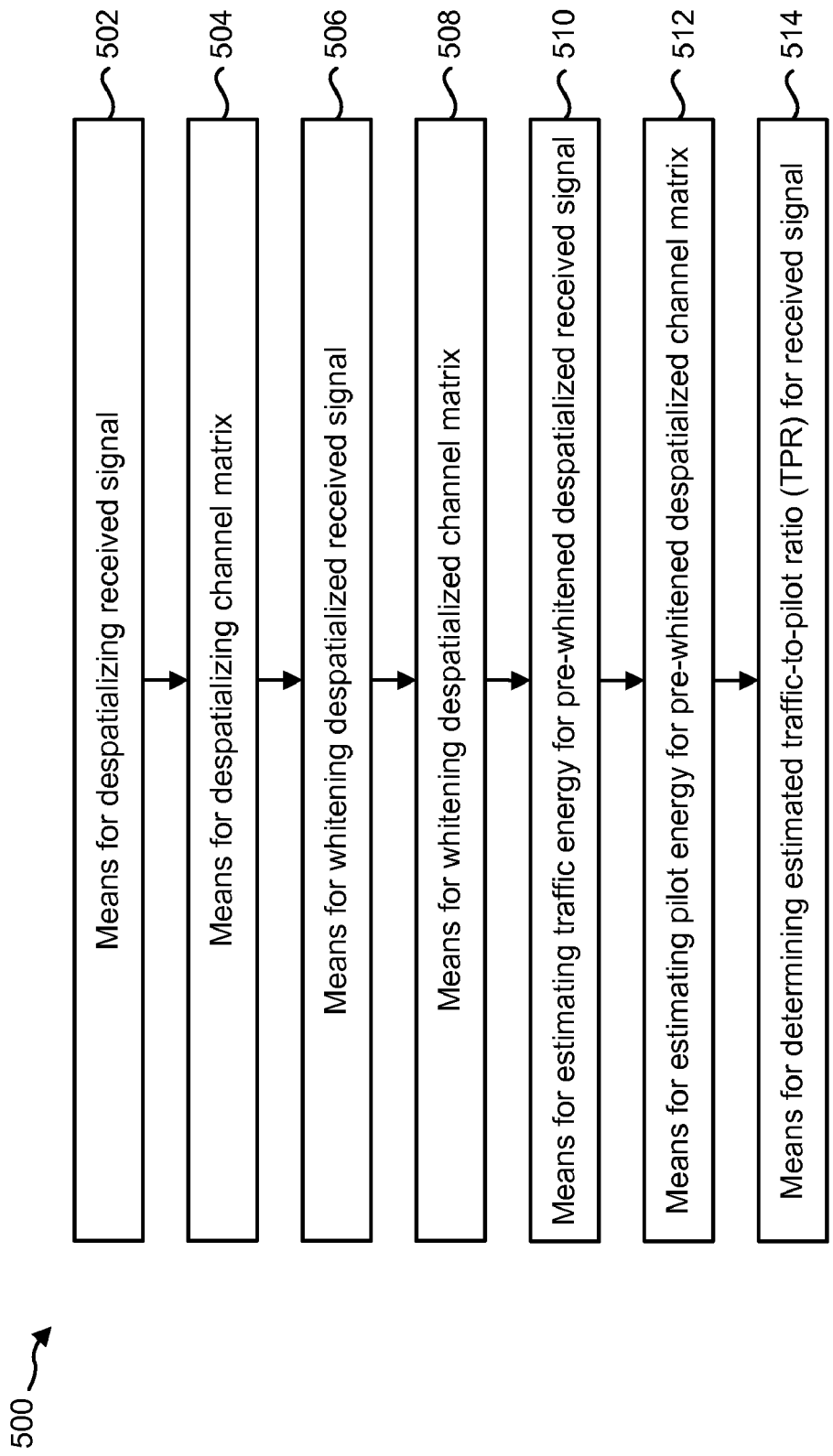
FIG. 5 illustrates means-plus-function blocks corresponding to the method of FIG. 4.

The method 400 of FIG. 4 described above may be performed by various hardware and/or software component(s) and/or module(s) corresponding to the means-plus-function blocks 500 illustrated in FIG. 5. In other words, blocks 402 through 414 illustrated in FIG. 4 correspond to means-plus-function blocks 502 through 514 illustrated in FIG. 5.

Figure 6:
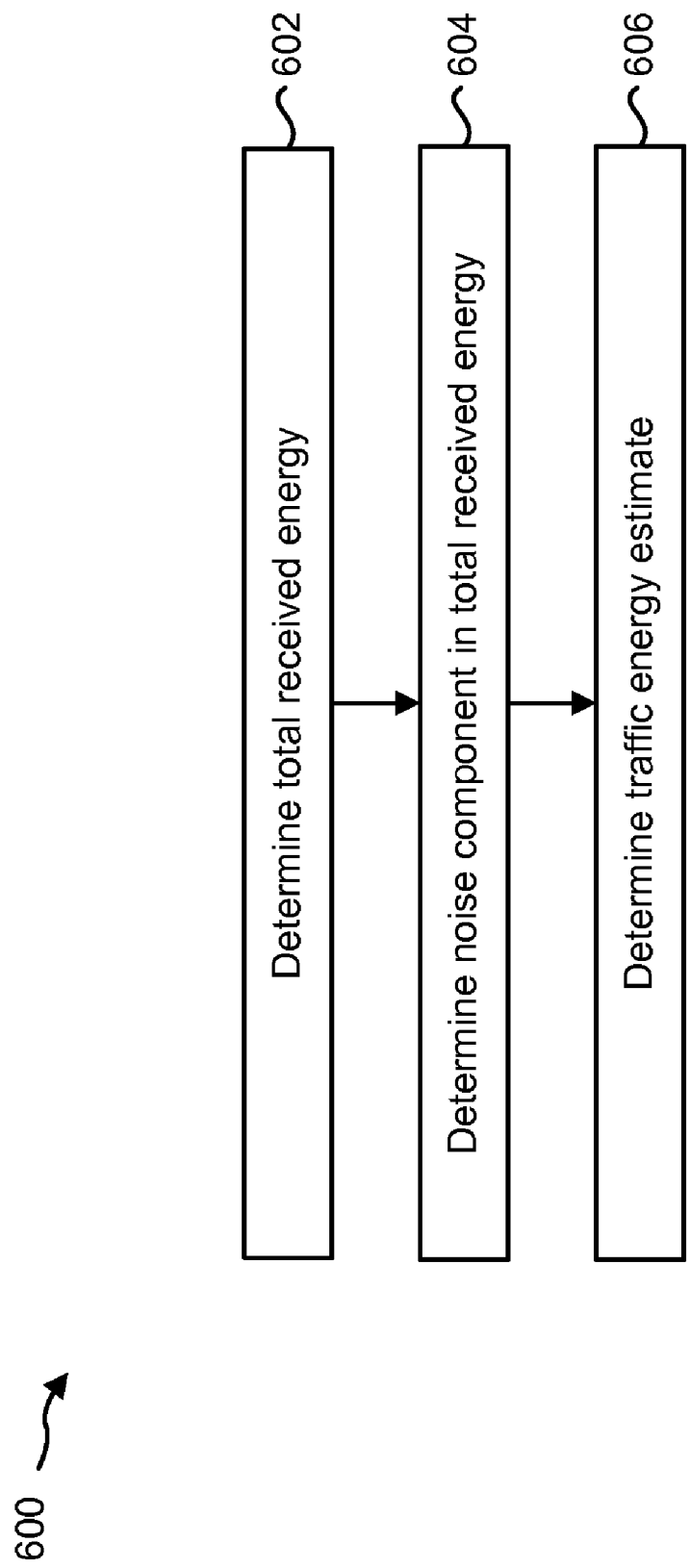
FIG. 6 is a flow diagram illustrating a method for determining a traffic energy estimate.

FIG. 6 is a flow diagram illustrating a method 600 for determining a traffic energy estimate 342. A mobile device 104 may determine 602 the total energy received. The mobile device 104 may also determine 604 a noise component in the total received energy. The mobile device 104 may then determine 606 a traffic energy estimate 342 using the total received energy and the noise component in the total received energy.

Figure 7:
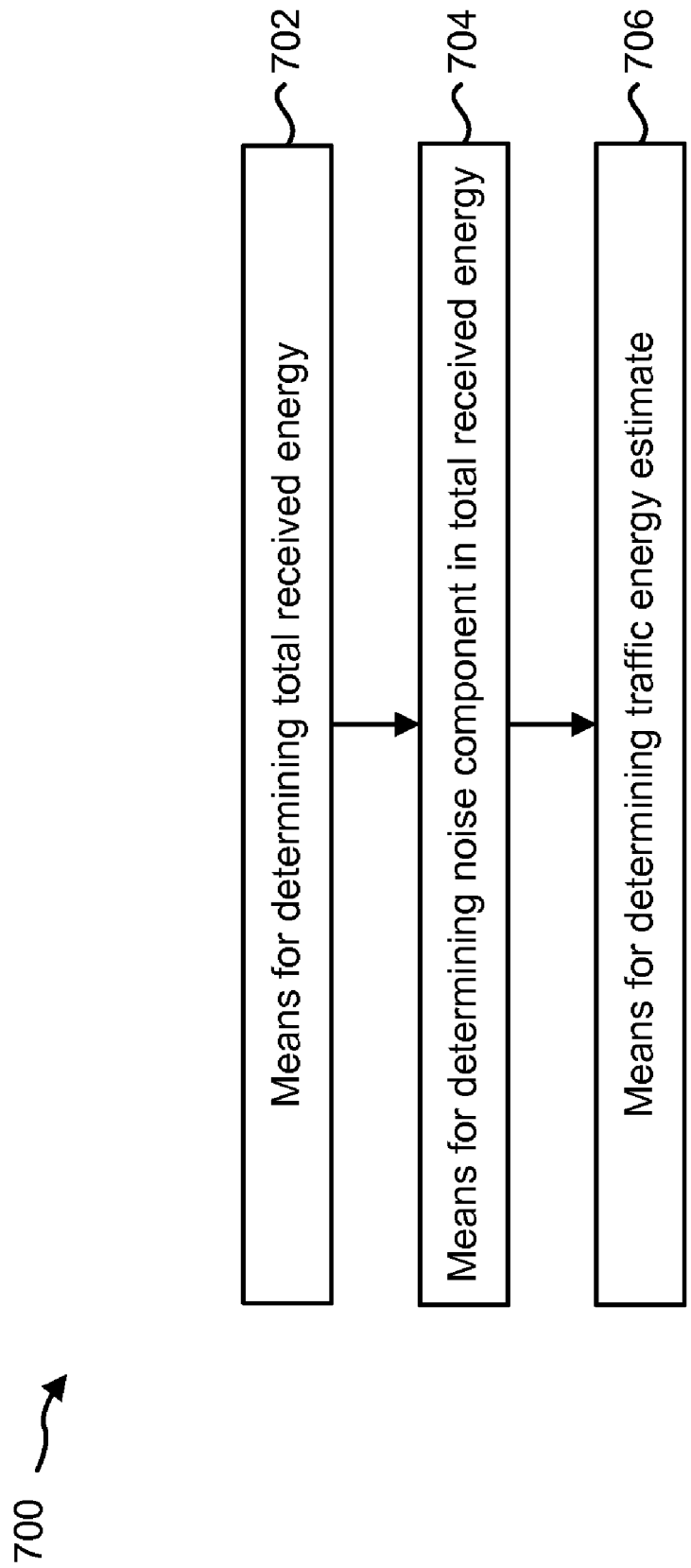
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 606 illustrated in FIG. 6 correspond to means-plus-function blocks 702 through 706 illustrated in FIG. 7.

Figure 8:
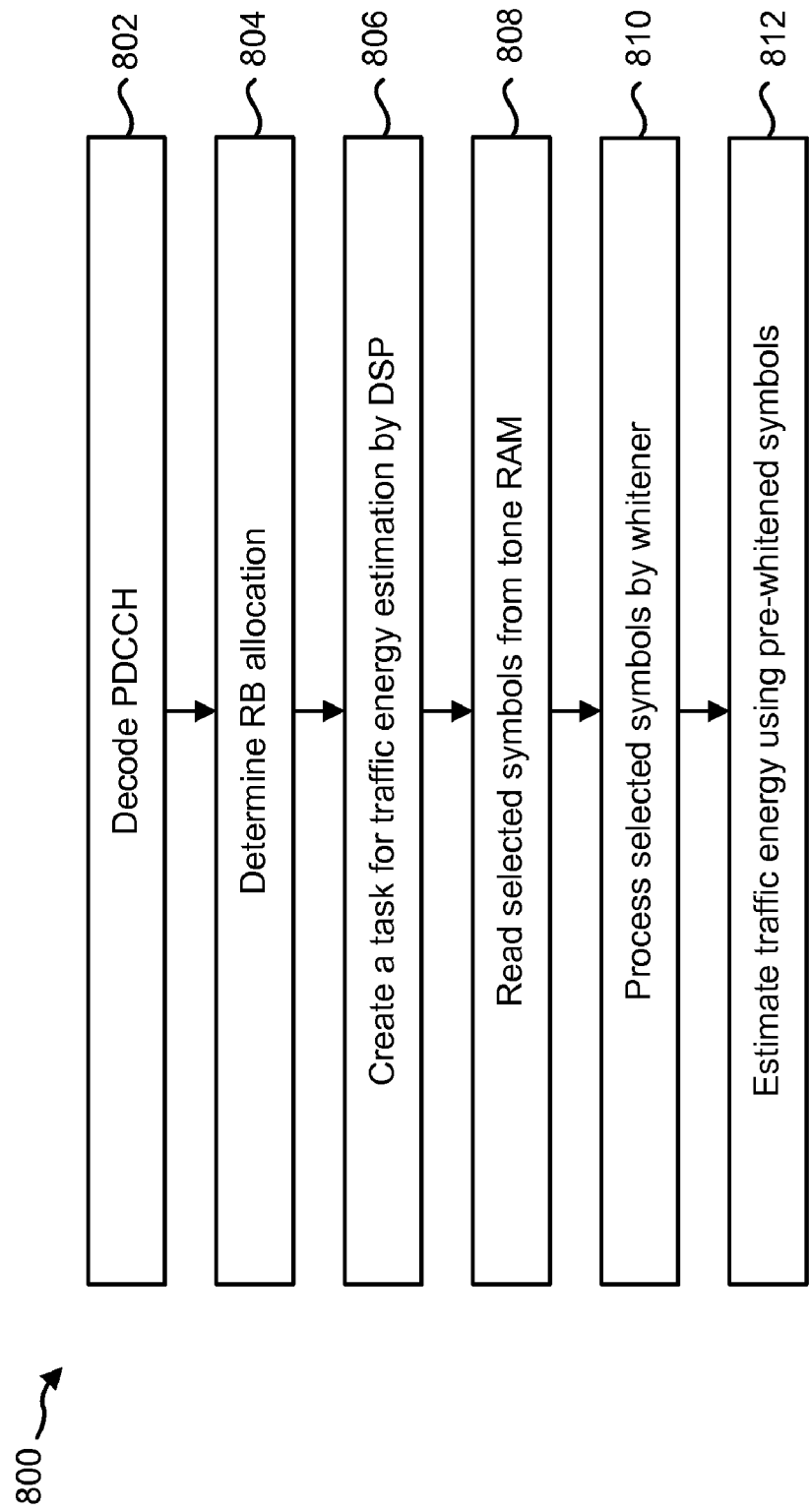
FIG. 8 is a flow diagram illustrating another method for determining a traffic energy estimate.

FIG. 8 is a flow diagram illustrating another method 800 for determining a traffic energy estimate 342. A mobile device 104 may decode 802 the physical downlink control channel (PDCCH). The mobile device 104 may then decode 804 the RB allocation. Next, a digital signal processor (DSP) may create 806 a task for traffic energy estimation. The mobile device 104 may read 808 selected symbols from the tone RAM. The mobile device 104 may process 810 the selected symbols using a whitener 332. The pre-whitened symbols may be used by the mobile device 104 to estimate 812 traffic energy.

A baseline selection rule may be defined to use all the available OFDM symbols for traffic energy estimation. In order to reduce complexity, a simplified selection rule may be used. The simplified selection rule is illustrated in Table 2 below. In Table 2, CP stands for cyclic prefix.

TABLE 2

| Number of RBs assigned | OFDM symbol index (normal CP) | OFDM symbol index (extended CP) | Type |
| --- | --- | --- | --- |
| 110~56 | 3 | 4 | Slot based |
| 55~28 | 3, 10 | 4, 10 | Subframe based |
| 27~14 | 3, 5, 10, 12 | 4, 5, 10, 11 | Subframe based |
| 13~7 | 3, 5, 6, 10, 12, 13 | 3, 4, 5, 9, 10, 11 | Subframe based |
| 6~1 | All available | All available | Subframe based |

The simplified selection rule of Table 2 may substantially reduce the number of resource elements used for traffic energy estimation. This is because there are at most 110(RB)× 1(Symb)×12(Tone)=1320 tones used.

Figure 9:
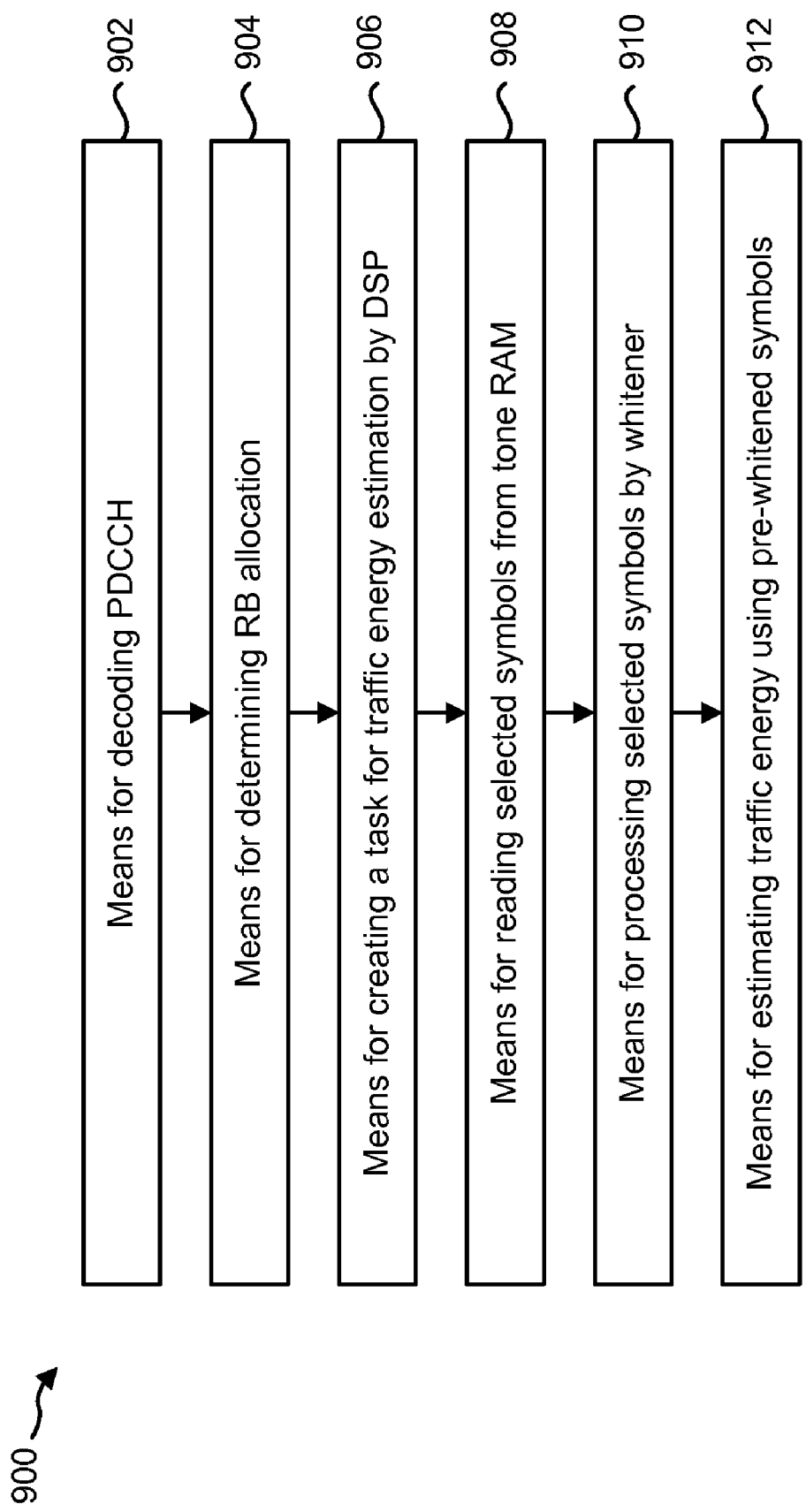
FIG. 9 illustrates means-plus-function blocks corresponding to the method of FIG. 8.

The method 800 of FIG. 8 described above may be performed by various hardware and/or software component(s) and/or module(s) corresponding to the means-plus-function blocks 900 illustrated in FIG. 9. In other words, blocks 802 through 812 illustrated in FIG. 8 correspond to means-plus-function blocks 902 through 912 illustrated in FIG. 9.

Figure 10:
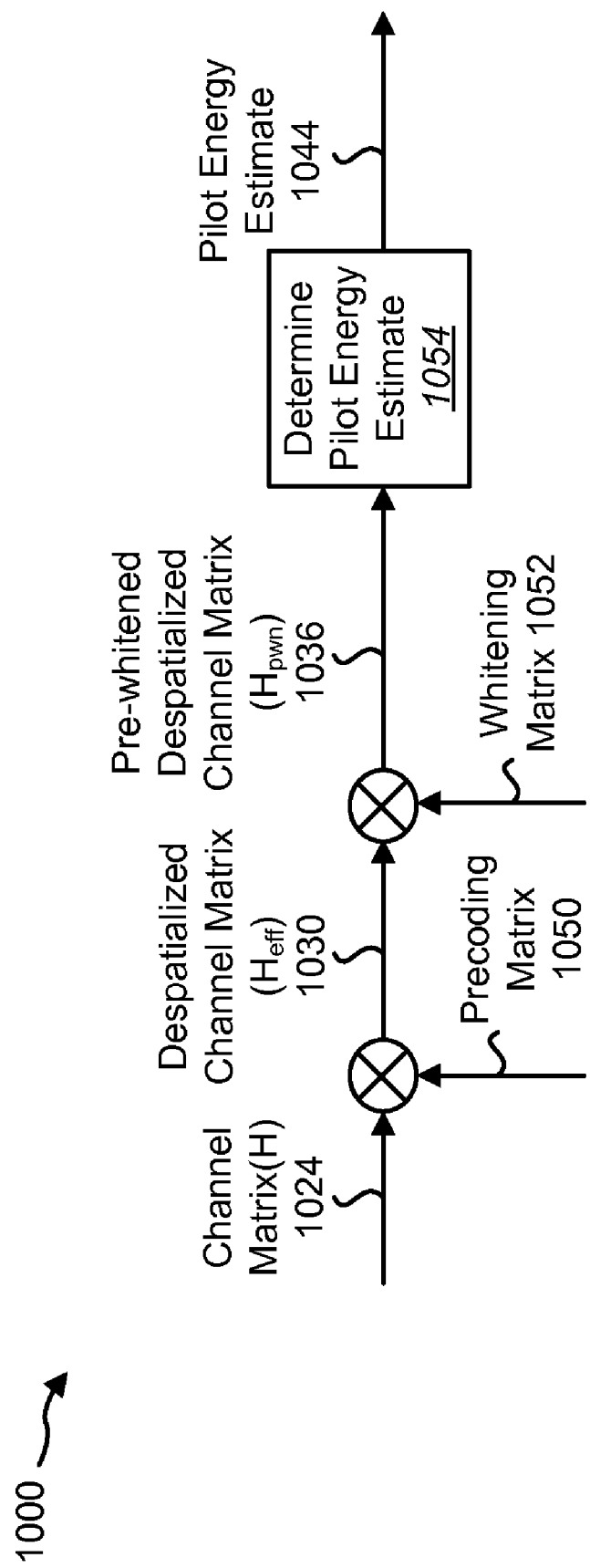
FIG. 10 is a block diagram illustrating the estimation of pilot energy.

FIG. 10 is a block diagram illustrating the estimation 1000 of pilot energy. A channel matrix (H) 1024 may be multiplied by a precoding matrix 1050 to obtain a despatialized channel matrix ($H_{eff}$) 1030. The despatialized channel matrix 1030 may then be multiplied by a whitening matrix 1052 to obtain a pre-whitened despatialized channel matrix ($H_{pwn}$) 1036. A pilot energy estimate 1044 may then be determined 1054 using the pre-whitened despatialized channel matrix 1036.

Figure 11:
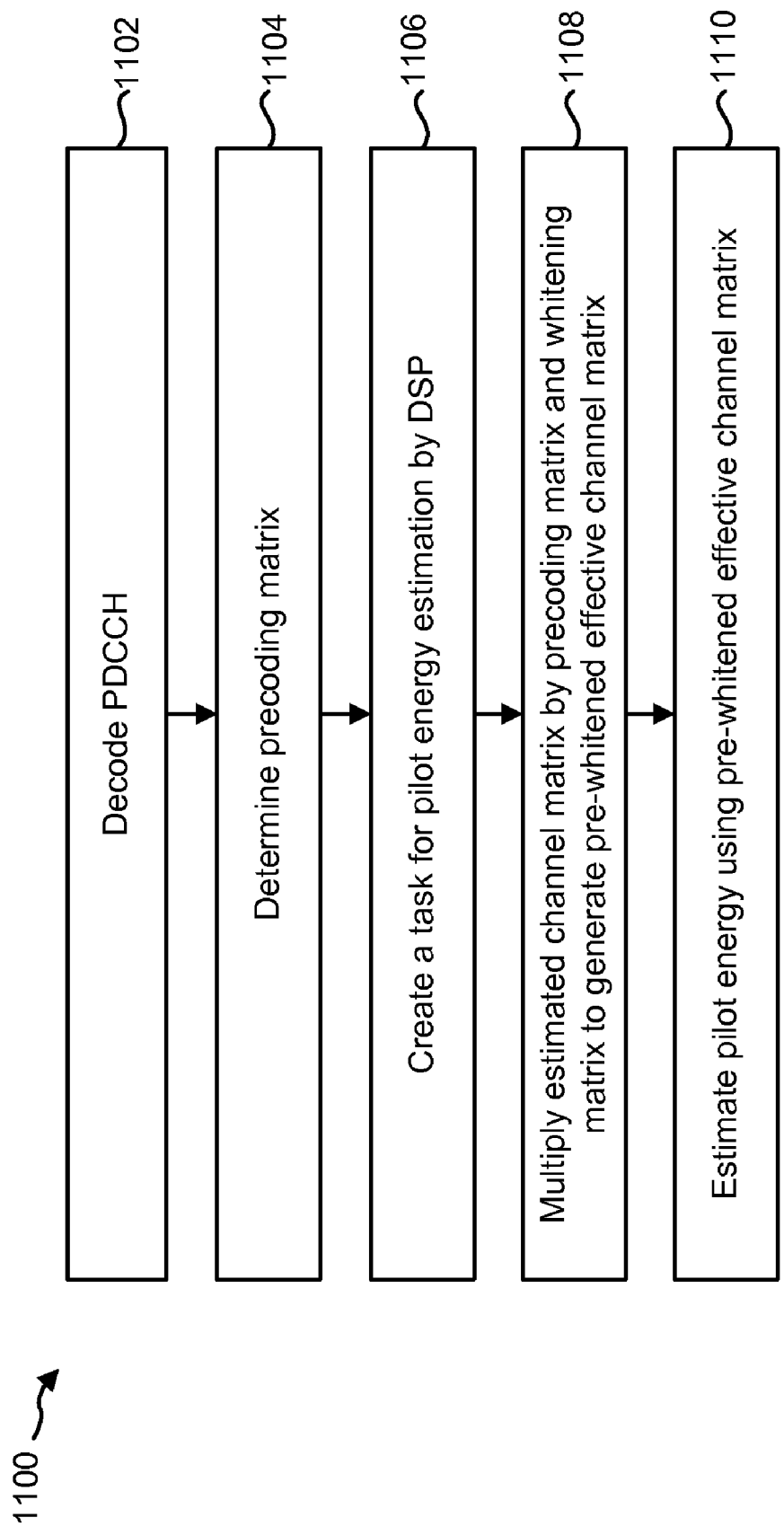
FIG. 11 is a flow diagram illustrating another method for pilot energy estimation.

FIG. 11 is a flow diagram illustrating another method 1100 for pilot energy estimation. A mobile device 104 may decode 1102 the physical downlink control channel (PDCCH). The mobile device 104 may then determine 1104 a precoding matrix 1050. A DSP may create 1106 a task for pilot energy estimation. For a set of selected resource elements, the estimated channel matrix 1024 may be multiplied 1108 by the precoding matrix 1050 and by the whitening matrix 1052 to generate a pre-whitened despatialized channel matrix 1036. The mobile device 104 may then estimate 1110 the pilot energy using the pre-whitened despatialized channel matrix 1036.

In order to reduce complexity, the resource elements used for pilot energy estimation may be selected using a symbol selection rule and a tone selection rule. In the symbol selection rule, if the traffic energy estimation is subframe-based, then for both slots, the channel estimation results after infinite impulse response (IIR) filtering but before time domain interpolation may be used. This set of channel estimates may correspond to a certain time slot (after group delay compensation) within that slot. This set of channel estimates may also cover all the subcarriers in the frequency domain. In the symbol selection rule, if the traffic energy estimation is slot-based, the channel estimation results after IIR filtering but before time domain interpolation may be used only in the first slot.

In the tone selection rule, only two tones are used from those resource blocks allocated to the mobile device 104. In one configuration, tone-0 and tone-6 may be selected as the tones used. The symbol selection rule and tone selection rule may substantially reduce the number of resource elements used for pilot energy estimation. For example, there may be only 110(RB)×1(Symb)×2(Tone)=220 channel matrices used. There are two reasons for using these selection rules. First, noise may already be sufficiently suppressed in the channel estimation results. Thus, it may be unnecessary to average over a large number of resource elements for processing gain. Second, the channel variation in both the time and the frequency domain may be well captured by the resource elements selected.

Figure 12:
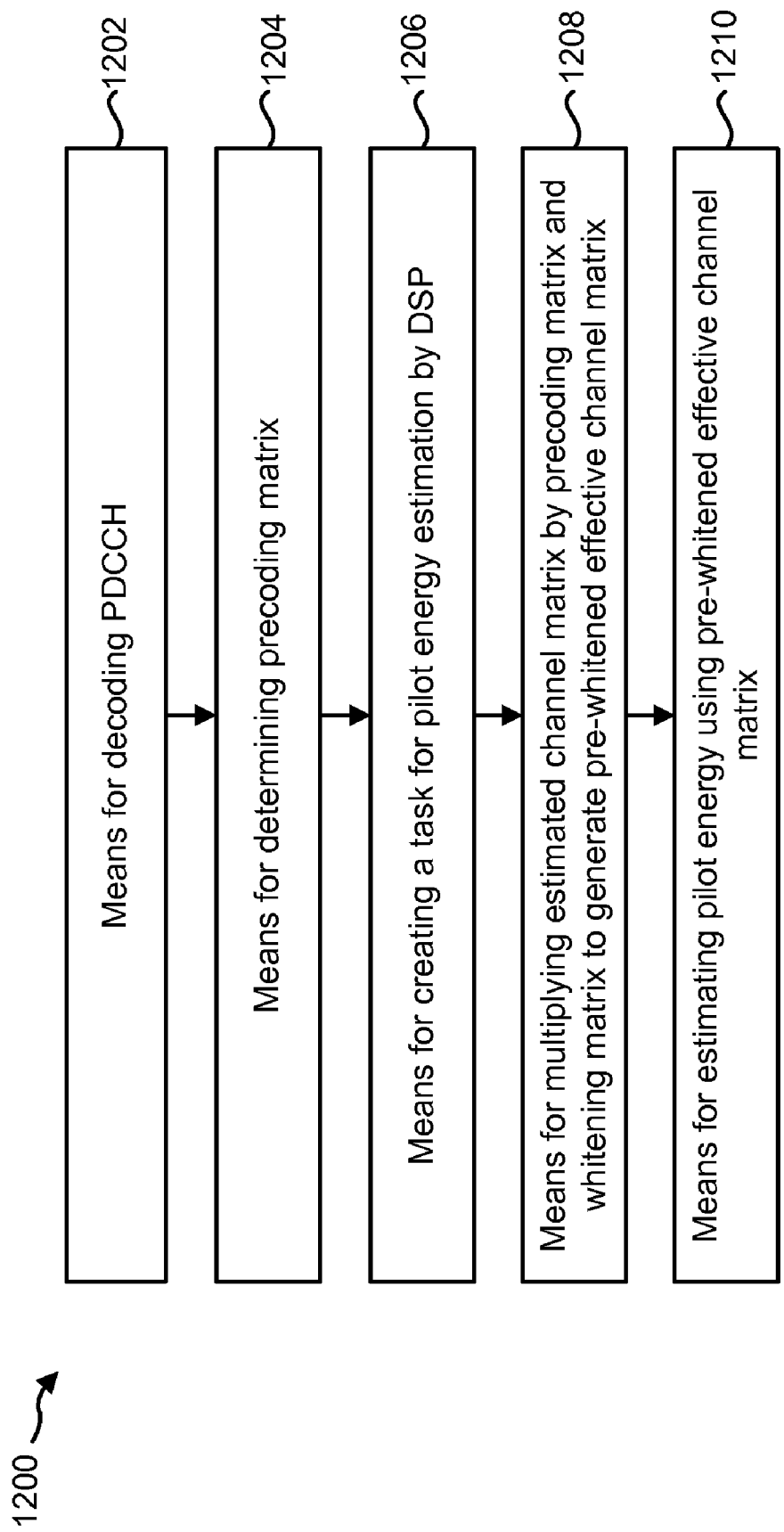
FIG. 12 illustrates means-plus-function blocks corresponding to the method of FIG. 11.

The method 1100 of FIG. 11 described above may be performed by various hardware and/or software component(s) and/or module(s) corresponding to the means-plus-function blocks 1200 illustrated in FIG. 12. In other words, blocks 1102 through 1110 illustrated in FIG. 11 correspond to means-plus-function blocks 1202 through 1210 illustrated in FIG. 12.

Figure 13:
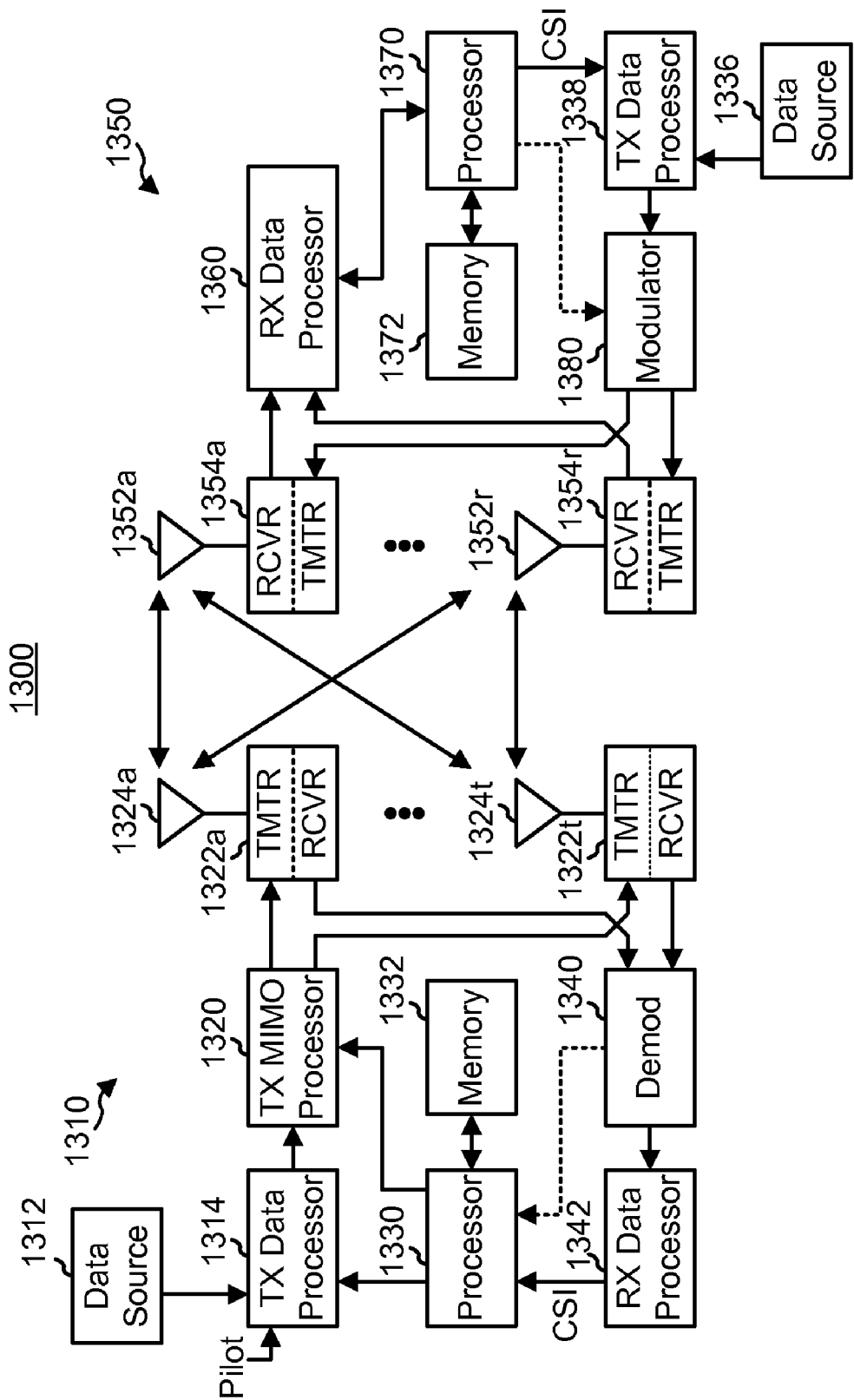
FIG. 13 is a block diagram of a transmitter system and a receiver system in a MIMO system.

FIG. 13 is a block diagram of a transmitter system 1310 and a receiver system 1350 in a MIMO system 1300. In one configuration, the transmitter system 1310 may be implemented by a base station and the receiver system 1350 may be implemented by a mobile device. Alternatively, the transmitter system 1310 may be implemented by a mobile device and the receiver system may be implemented by a base station. At the transmitter system 1310, traffic data for a number of data streams may be provided from a data source 1312 to a transmit (TX) data processor 1314.

In one configuration, each data stream may be transmitted over a respective transmit antenna. The TX data processor 1314 may format, encode, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then be modulated (i.e., symbol mapped) based on a particular modulation scheme (e.g., Quadrature Phase Shift Keying (QPSK), 8 Phase Shift Keying (8PSK), 16 Quadrature Amplitude Modulation (16QAM), 64QAM) selected for that data stream to provide modulation symbols. The data rate, coding, and modulation for each data stream may be determined by instructions performed by processor 1330.

The modulation symbols for all data streams may then be provided to a TX MIMO processor 1320, which may further process the modulation symbols (e.g., for OFDM). TX MIMO processor 1320 then provides $N_T$ modulation symbol streams to $N_T$ transmitters (TMTR) 1322a through 1322t. In some configurations, TX MIMO processor 1320 may apply beamforming weights to the symbols of the data streams and to the antenna from which the symbol is being transmitted.

Each transmitter 1322 may receive and process a respective symbol stream to provide one or more analog signals, and further condition (e.g., amplifies, filters, and upconverts) the analog signals to provide a modulated signal suitable for transmission over the MIMO channel. $N_T$ modulated signals from transmitters 1322a through 1322t may then be transmitted from $N_T$ antennas 1324a through 1324t, respectively.

At receiver system 1350, the transmitted modulated signals may be received by $N_R$ antennas 1352a through 1352r and the received signal from each antenna 1352 may be provided to a respective receiver (RCVR) 1354a through 1354r. Each receiver 1354 may condition (e.g., filters, amplifies, and downconverts) a respective received signal, digitize the conditioned signal to provide samples, and further process the samples to provide a corresponding "received" symbol stream.

An RX data processor 1360 may then receive and process the $N_R$ received symbol streams from $N_R$ receivers 1354 based on a particular receiver processing technique to provide $N_T$ "detected" symbol streams. The RX data processor 1360 may then demodulate, deinterleave, and decode each detected symbol stream to recover the traffic data for the data stream. The processing by RX data processor 1360 may be complementary to that performed by TX MIMO processor 1320 and TX data processor 1314 at transmitter system 1310.

A processor 1370 may periodically determine which precoding matrix to use (discussed below). The processor 1370 may also formulate a reverse link message comprising a matrix index portion and a rank value portion.

The reverse link message may comprise various types of information regarding the communication link and/or the received data stream. The reverse link message may then be processed by a TX data processor 1338, which may also receive traffic data for a number of data streams from a data source 1336, modulated by a modulator 1380, conditioned by transmitters 1354a through 1354r, and transmitted back to the transmitter system 1310.

At the transmitter system 1310, the modulated signals from receiver system 1350 may be received by the antennas 1324, conditioned by the receivers 1322, demodulated by a demodulator 1340, and processed by a RX data processor 1342 to extract the reserve link message transmitted by the receiver system 1350. The processor 1330 may then determine which pre-coding matrix to use for determining the beamforming weights and then process the extracted message.

The processors 1330, 1370 may be in electronic communication with memory for storing data or instructions. For example, processor 1330 may be in electronic communication with memory 1332, and processor 1370 may be in electronic communication with memory 1372.

Figure 14:
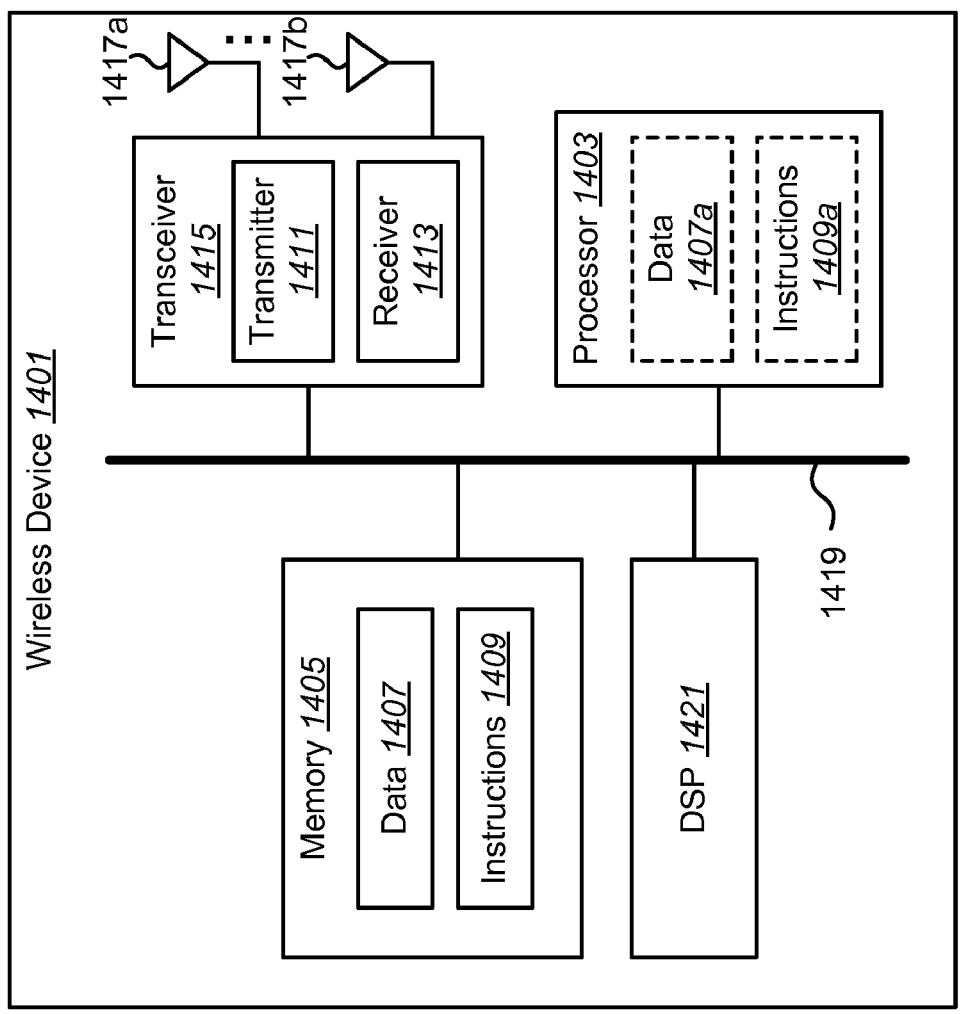
FIG. 14 illustrates certain components that may be included within a wireless device that is configured in accordance with the present disclosure.

FIG. 14 illustrates certain components that may be included within a wireless device 1401. The wireless device 1401 may be a mobile device 104 or a base station 102.

The wireless device 1401 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. In one configuration, the wireless device 1401 may include a separate DSP 1421 in addition to the processor 1403. The processor 1403 may be referred to as a central processing unit (CPU). Although just a single processor 1403 is shown in the wireless device 1401 of FIG. 14, in an alternative configuration, a combination of processors (e.g., an ARM and DSP) could be used.

The wireless device 1401 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405. When the processor 1403 executes the instructions 1407, various portions of the instructions 1407a may be loaded onto the processor 1403, and various pieces of data 1409a may be loaded onto the processor 1403.

The wireless device 1401 may also include a transmitter 1411 and a receiver 1413 to allow transmission and reception of signals to and from the wireless device 1401. The transmitter 1411 and receiver 1413 may be collectively referred to as a transceiver 1415. An antenna 1417 may be electrically coupled to the transceiver 1415. The wireless device 1401 may also include multiple transmitters, multiple receivers, multiple transceivers and/or multiple antenna 1417a, 1417b.

The various components of the wireless device 1401 may be coupled together by one or more buses, which may include a power bus, a control signal bus, a status signal bus, a data bus, etc. For the sake of clarity, the various buses are illustrated in FIG. 14 as a bus system 1419.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4, 6, 8 and 11, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for estimating a traffic-to-pilot ratio (TPR) for a received signal, the method comprising:
    despatializing the received signal to obtain a despatialized received signal;
    despatializing a channel matrix to obtain a despatialized channel matrix;
    whitening the despatialized received signal to obtain a pre-whitened despatialized received signal;
    whitening the despatialized channel matrix to obtain a pre-whitened despatialized channel matrix; and
    determining an estimated TPR for the received signal using the pre-whitened despatialized received signal and one or more pre-whitened despatialized channel estimation coefficients.

2. The method of claim 1, wherein determining the estimated TPR for the received signal comprises:
    estimating traffic energy for the pre-whitened despatialized received signal;
    estimating pilot energy for the pre-whitened despatialized channel matrix; and
    determining the estimated TPR using the estimated traffic energy and the estimated pilot energy.

3. The method of claim 2, wherein estimating traffic energy comprises:
    determining a total received energy;
    determining a noise component in the total received energy; and
    determining a traffic energy estimate using the total received energy and the noise component in the total received energy.

4. The method of claim 3, wherein determining a traffic energy estimate is performed per subframe.

5. The method of claim 2, wherein estimating traffic energy comprises:
    decoding a physical downlink control channel (PDCCH);
    determining a resource block (RB) allocation;
    creating a task for traffic energy estimation;
    reading selected symbols from a tone random access memory (RAM);
    processing the selected symbols by a whitener to obtain pre-whitened symbols; and
    estimating the traffic energy using the pre-whitened symbols.

6. The method of claim 2, wherein estimating pilot energy comprises:
    multiplying the channel matrix by a precoding matrix to obtain a despatialized channel matrix;
    multiplying the despatialized channel matrix by a whitening matrix to obtain a pre-whitened despatialized channel matrix; and
    determining a pilot energy estimate using the pre-whitened despatialized channel matrix.

7. The method of claim 6, wherein determining a pilot energy estimate is performed per subframe.

8. The method of claim 2, wherein estimating pilot energy comprises:
    decoding a physical downlink control channel (PDCCH);
    determining a precoding matrix;
    creating a task for pilot energy estimation;
    multiplying an estimated channel matrix by the precoding matrix and by a whitening matrix to generate a pre-whitened effective channel matrix; and
    estimating the pilot energy using the pre-whitened effective channel matrix.

9. The method of claim 1, wherein the channel matrix is an estimated channel matrix.

10. The method of claim 1, wherein the method is performed by a mobile device.

11. The method of claim 10, wherein the mobile device is configured to operate in a multiple-input and multiple-output (MIMO)-orthogonal frequency division multiplexing (OFDM) system.

12. A wireless device configured for estimating a traffic-to-pilot ratio (TPR) for a received signal, comprising:
    a processor;
    memory in electronic communication with the processor;
    instructions stored in the memory, the instructions being executable by the processor to:
        despatialize the received signal to obtain a despatialized received signal;
        despatialize a channel matrix to obtain a despatialized channel matrix;
        whiten the despatialized received signal to obtain a pre-whitened despatialized received signal;
        whiten the despatialized channel matrix to obtain a pre-whitened despatialized channel matrix; and
        determine an estimated TPR for the received signal using the pre-whitened despatialized received signal and one or more pre-whitened despatialized channel estimation coefficients.

13. The wireless device of claim 12, wherein determining the estimated TPR for the received signal comprises:
    estimating traffic energy for the pre-whitened despatialized received signal;
    estimating pilot energy for the pre-whitened despatialized channel matrix; and
    determining the estimated TPR using the estimated traffic energy and the estimated pilot energy.

14. The wireless device of claim 13, wherein estimating traffic energy comprises:
   determining a total received energy;
   determining a noise component in the total received energy; and
   determining a traffic energy estimate using the total received energy and the noise component in the total received energy.

15. The wireless device of claim 14, wherein determining a traffic energy estimate is performed per subframe.

16. The wireless device of claim 13, wherein estimating traffic energy comprises:
   decoding a physical downlink control channel (PDCCH);
   determining a resource block (RB) allocation;
   creating a task for traffic energy estimation;
   reading selected symbols from a tone random access memory (RAM);
   processing the selected symbols by a whitener to obtain pre-whitened symbols; and
   estimating the traffic energy using the pre-whitened symbols.

17. The wireless device of claim 13, wherein estimating pilot energy comprises:
   multiplying the channel matrix by a precoding matrix to obtain a despatialized channel matrix;
   multiplying the despatialized channel matrix by a whitening matrix to obtain a pre-whitened despatialized channel matrix; and
   determining a pilot energy estimate using the pre-whitened despatialized channel matrix.

18. The wireless device of claim 17, wherein determining a pilot energy estimate is performed per subframe.

19. The wireless device of claim 13, wherein estimating pilot energy comprises:
   decoding a physical downlink control channel (PDCCH);
   determining a precoding matrix;
   creating a task for pilot energy estimation;
   multiplying an estimated channel matrix by the precoding matrix and by a whitening matrix to generate a pre-whitened effective channel matrix; and
   estimating the pilot energy using the pre-whitened effective channel matrix.

20. The wireless device of claim 12, wherein the channel matrix is an estimated channel matrix.

21. The wireless device of claim 12, wherein the wireless device is a mobile device.

22. The wireless device of claim 21, wherein the mobile device is configured to operate in a multiple-input and multiple-output (MIMO)-orthogonal frequency division multiplexing (OFDM) system.

23. A wireless device configured for estimating a traffic-to-pilot ratio (TPR) for a received signal, comprising:
   means for despatializing the received signal to obtain a despatialized received signal;
   means for despatializing a channel matrix to obtain a despatialized channel matrix;
   means for whitening the despatialized received signal to obtain a pre-whitened despatialized received signal;
   means for whitening the despatialized channel matrix to obtain a pre-whitened despatialized channel matrix; and
   means for determining an estimated TPR for the received signal using the pre-whitened despatialized received signal and one or more pre-whitened despatialized channel estimation coefficients.

24. A computer-program product for estimating a traffic-to-pilot ratio (TPR) for a received signal, the computer-program product comprising a computer-readable medium having instructions thereon, the instructions comprising:
   code for despatializing the received signal to obtain a despatialized received signal;
   code for despatializing a channel matrix to obtain a despatialized channel matrix;
   code for whitening the despatialized received signal to obtain a pre-whitened despatialized received signal;
   code for whitening the despatialized channel matrix to obtain a pre-whitened despatialized channel matrix; and
   code for determining an estimated TPR for the received signal using the pre-whitened despatialized received signal and one or more pre-whitened despatialized channel estimation coefficients.

* * * * *